United States Patent
Oda et al.

(10) Patent No.: US 6,684,575 B2
(45) Date of Patent: Feb. 3, 2004

(54) WEATHER STRIP FOR AUTOMOBILE

(75) Inventors: Hiromu Oda, Hiroshima (JP); Syuuji Raisu, Hiroshima (JP); Takashi Yamashita, Hiroshima (JP); Takashi Ogawa, Utsunomiya (JP)

(73) Assignees: Nishikawa Rubber Co., Ltd., Hiroshima (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/186,575

(22) Filed: Jul. 1, 2002

(65) Prior Publication Data

US 2003/0019160 A1 Jan. 30, 2003

(30) Foreign Application Priority Data

Jul. 2, 2001 (JP) ........................................ 2001-201365

(51) Int. Cl.[7] ................................................. E06B 7/22
(52) U.S. Cl. ...................................... 49/498.1; 49/490.1
(58) Field of Search ............................. 49/475.1, 490.1, 49/495.1, 498.1

(56) References Cited

U.S. PATENT DOCUMENTS 5,806,914 A * 9/1998 Okada ..................... 296/146.9
6,158,171 A * 12/2000 Kellogg et al. ............ 49/498.1
6,442,902 B1 * 9/2002 Van Den Oord .......... 49/498.1

FOREIGN PATENT DOCUMENTS

| JP | 2-3527 | * 2/1990 | ................ 49/498.1 |
| JP | 2000-142266 | * 5/2000 | ................ 49/498.1 |
| JP | 2000-301951 | * 10/2000 | ................ 49/498.1 |

* cited by examiner

Primary Examiner—Jerry Redman
(74) Attorney, Agent, or Firm—Frishauf, Holtz, Goodman & Chick, P.C.

(57) ABSTRACT

A weather strip includes an attachment base (10) and a hollow seal portion (30). The hollow seal portion (30) is integrally moulded with the outer wall (11) of the attachment base (10), and it makes a resilient contact with the door (42) when the door (42) of a vehicle is closed. The hollow seal portion (30) has a first wall (31), second wall (32), third wall (33), fourth wall (34) and bridge (35). The bridge (35) is spanned between the second wall (32) and the fourth wall (34). The hollow seal portion (30) includes bending points which bend when the door (42) is closed. The bending points include a connection part (51) formed between the second wall (32) and the third wall (33), a connection part (52) formed between the third wall (33) and the fourth wall (34), and a connection part (53) formed between the first wall (31) and the fourth wall (34).

8 Claims, 5 Drawing Sheets

WEATHER STRIP FOR AUTOMOBILE

BACKGROUND OF THE INVENTION

This invention relates to a weather strip for vehicles attached along the door opening of a vehicle body.

As shown in FIGS. 3 to 5, a conventional type of a weather strip is attached along the body 40 of a vehicle. The weather strip includes an attachment base 10 and a hollow seal part 20. The attachment base 10 is U-shaped in section and is attached to a flange provided along the opening of the door 42. The hollow seal part 20 is integrally moulded with the outside wall 11 of the attachment base 10 and makes a resilient contact with the door 40 when the door 40 is closed. The inside of the hollow seal part 20 is divided by the bridge 25. The side walls 11, 12 of the attachment base 10 are provided with protruding lips 15, 15 at inner sides thereof, which slide on the surfaces of the flange 41 when the attachment base 10 is attached to the flange 41. The inner side wall 12 is provided with a tongue-shaped seal lip 16. The inner metal member 17 is embedded in the attachment base 10.

Although the bridge 25 is provided in the hollow seal part 20 of this weather strip, the bridge 25 does not function as it should, since, as shown in FIG. 6, it allows the hollow seal part 20 to entirely deform. Therefore, as shown in FIG. 4, the hollow seal portion 20 is deteriorated in making a follow up performance along the curve of the corner part 60, thus, developing wrinkles in the corner part 60 in particular.

By raising the rigidity of the hollow seal part 20, the seal part 20 is upgraded and it may be able to follow up the curve of the corner part 60 successfully. The rigidity may be raised by, as shown in FIGS. 7 and 8, providing the bridge 25 between the portion where the door 42 makes a resilient contact with the door 42 and the portion which is the root area of the outer side wall 11 of the attachment base 10.

However, as shown in FIGS. 5 and 7, since each hollow seal part 20 is designed in a round-shaped figure in order to deform the entire portion thereof, the load makes a curve line as shown in FIG. 9 (a), where the load is generated at the time the door 42 is closed and the hollow seal part 20 makes a resilient contact with the door 42. Therefore, it is predicted in this whether strip according to the prior art that the dosing operation of the door 42 would be deteriorated since the load rapidly increases at the time the door 42 is dosed.

An object of the invention, therefore, is to provide a weather strip which can perform an improved door dosing operation, with a smooth follow up performance along the curve of a corner part.

SUMMARY OF THE INVENTION

According to a first aspect of the invention, a weather strip comprises an attachment base (10) and a hollow seal portion (30). The attachment base (10) is U-shaped in section and attached to a flange (41) provided along with the door opening of a vehicle body. The hollow seal portion (30) is integrally moulded with the outer wall (11) of the attachment base (10), and it makes a resilient contact with the door (42) when the door (42) of a vehicle is closed.

The hollow seal portion (30) includes a first wall (31), second wall (32), third wall (33), fourth wall (34) and bridge (35). The first wall (31) protrudes from the outer wall (11) of the attachment base (10) at the area near the bottom wall (13) of the attachment base (10). The second wall (32) is formed longer than the first wall (31) and protrudes from a near end of the outer wall (11). The first wall (31) and the second wall (32) extend from the outer wall (11) in opposite direction.

The third wall (33) is connected with an end of the second wall (32) at its one end, forming a rough rectangular shape with the second wall (32). The fourth wall (34) is connected to another end of the third wall (33) at its one end, and it is connected with an end of the first wall (31) at the other end. The fourth wall (34) is made longer than the other walls (31, 32, 33), and has a bulge curved toward outside of the vehicle.

The bridge (35) spans between the second wall (32) and the fourth wall (34). The hollow seal portion (30) has bending points which bend when the door (42) is closed. The bending points include a connection part (51) formed between the second wall (32) and the third wall (33), a connection part (52) formed between the third wall (33) and the fourth wall (34), and a connection part (53) formed between the first wall (31) and the fourth wall (34).

A weather strip according to a second aspect of the invention is characterized in that the connection part (51) formed between the second wall (32) and the third wall (33) as well as the connection part (52) formed between the third wall (33) and the fourth wall (34) are made thinner than the other parts of the hollow seal portion (30).

A weather strip according to a third aspect of the invention is characterized in that the bridge (35) is curved toward the first wall (31).

A weather strip according to a third aspect of the invention is characterized in that the attachment base (10) comprises an inner metal member (17) embedded therein. The inner metal member (17) extends approximately up to the middle of the second wall (32).

The numerals in parenthesis correspond to elements or matter indicated in the drawings and the preferred embodiment of the invention described thereinafter.

According to the first aspect of the invention, at the time the door is closed making a resilient contact with the hollow seal part, the hollow seal part bends at the following connection parts formed between second wall and the third wall, third wall and the fourth wall, and also the fourth wall and the first wall.

In this hollow seal portion, the bridge is provided between the second wall and the fourth wall, and the fourth wall is bulge curved while having the longest length among the walls. Therefore, the area provided between the portion in the fourth wall where the bridge is connected to and the connection part between the first wall and the fourth wall is largely bulge curved toward outside in comparison with the other areas of the hollow seal portion. At this point, the connection part between the third wall and the fourth wall is pulled toward the outside, which is the direction the fourth wall is projected to. Thus, the connection part between the second wall and the third wall, forming a rectangular shape, does not project toward the outside direction (which is the direction contrary to the direction the fourth wall projects to), though it bends.

Consequently, as shown in FIG. 9 (b), the flat section is generated, where little change is made in the load while a large change is made in the compression. Therefore, the drastic increasing of the load is suppressed and the dosing operation of the door improves.

According to the second aspect of the invention, the hollow seal portion bends more smoothly, since the bending points are made thinner than other parts of the hollow seal portion. The bending points are the connection parts between the second wall and the third wall as well as the third wall and the fourth wall.

According to the third aspect of the invention, the bridge bulge is projectively curved toward the first wall, so that the area made between the portion on the fourth wall where the bridge is connected to and the connection part between the first wall and the fourth wall can be projected further toward the outside.

According to the fourth aspect of the invention, the inner metal member embedded in the attachment base is projected to the area close to the middle of the second wall, so, that one end of the bridge connected to the second wall can be firmly fixed. Consequently, the fourth wall connected with another end of the bridge is able to follow up the curve of the corner part smoothly, thus, preventing a development and appearance of wrinkles at the corner part.

DETAILED DESCRIPTION OF THE INVENTION

Figure 1:
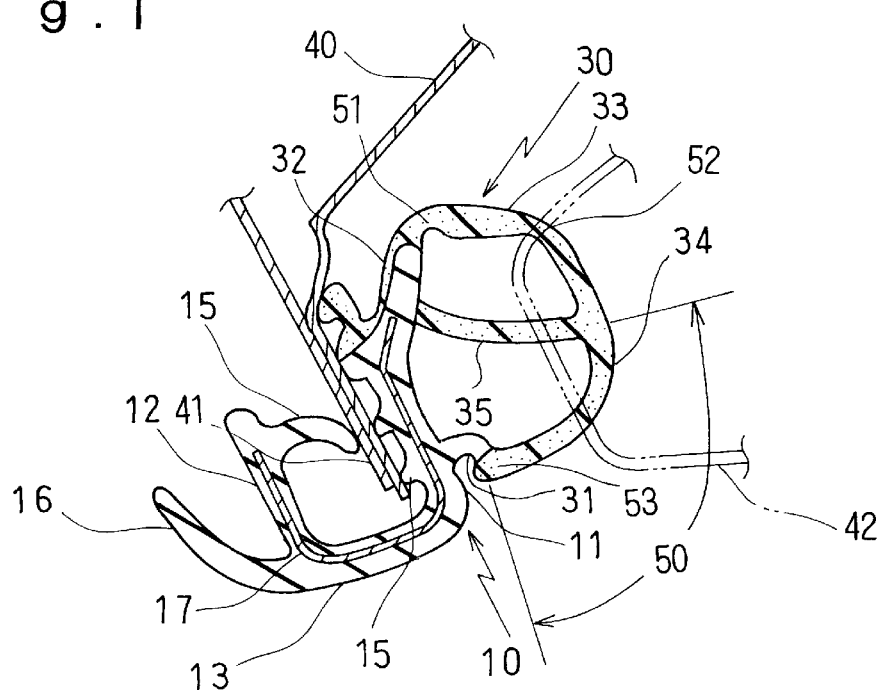
FIG. 1 is an expanded sectional view showing the preferred embodiment of the weather strip according to the invention, and is an expanded sectional view along line I—I in FIG. 4.
Figure 2:
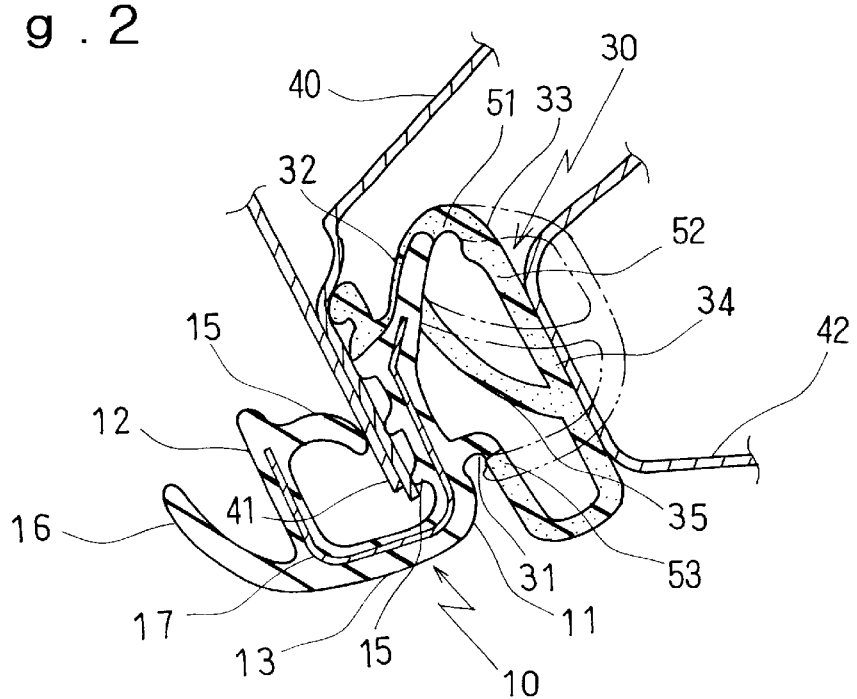
FIG. 2 is an expanded sectional view showing a deformation of the weather strip shown in FIG. 1.
Figure 3:
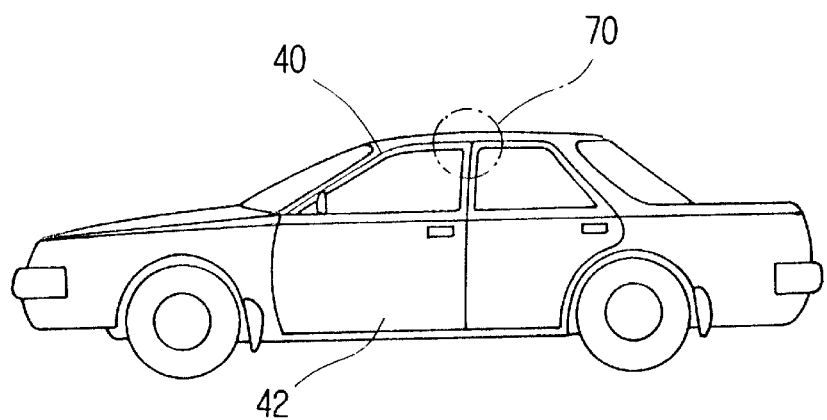
FIG. 3 is an appearance of a vehicle body.
Figure 4:
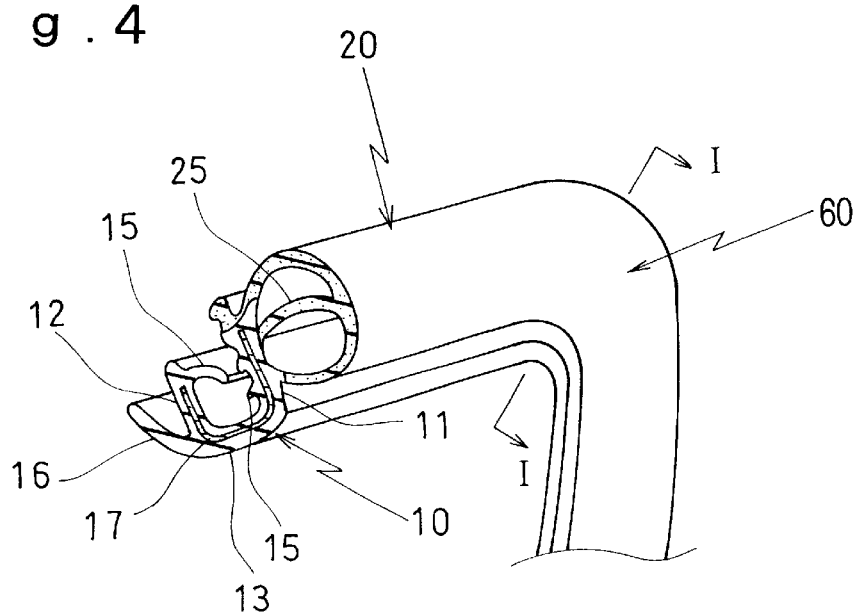
FIG. 4 is an expanded perspective view showing the weather strip attached to the portion shown with numeral 70 in FIG. 3.

A preferred embodiment of the invention will be described below referring FIGS. 1 and 2. FIG. 1 illustrates a sectional view where the door 42 is about to make a resilient contact with the weather strip. FIG. 2 illustrates a sectional view where the door 42 has made a resilient contact with the weather strip.

Figure 5:
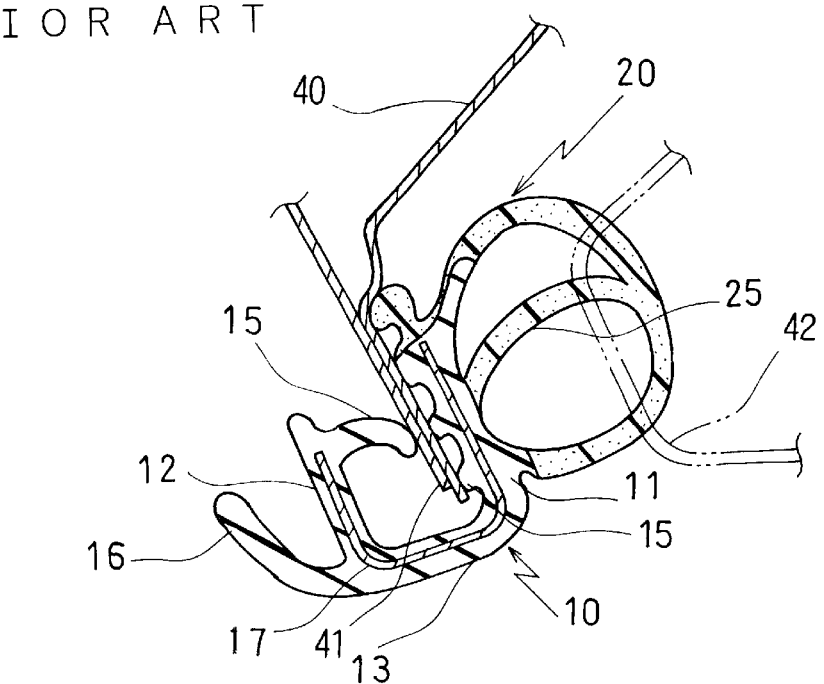
FIG. 5 is an expanded sectional view showing a conventional weather strip.
Figure 6:
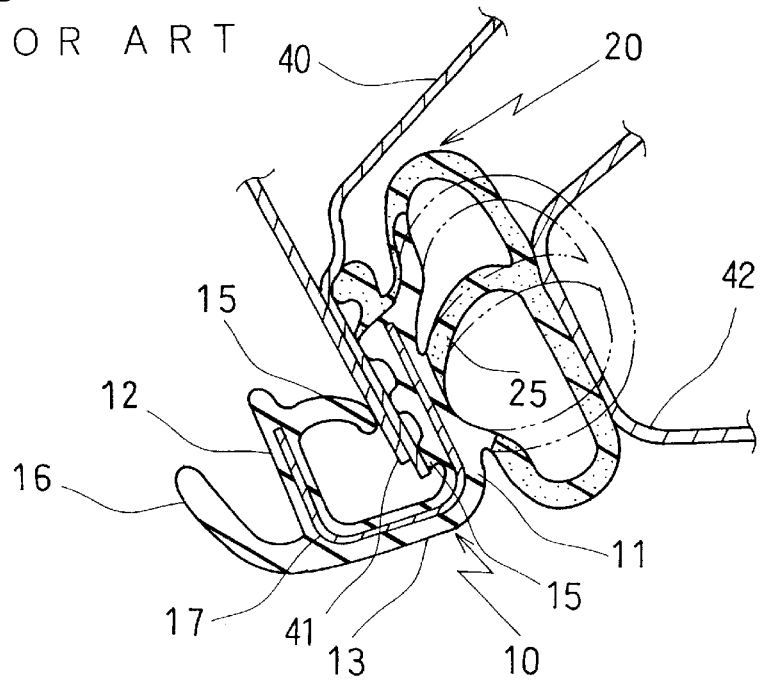
FIG. 6 is an expanded sectional view showing a deformation of the weather strip shown in FIG. 5.
Figure 7:
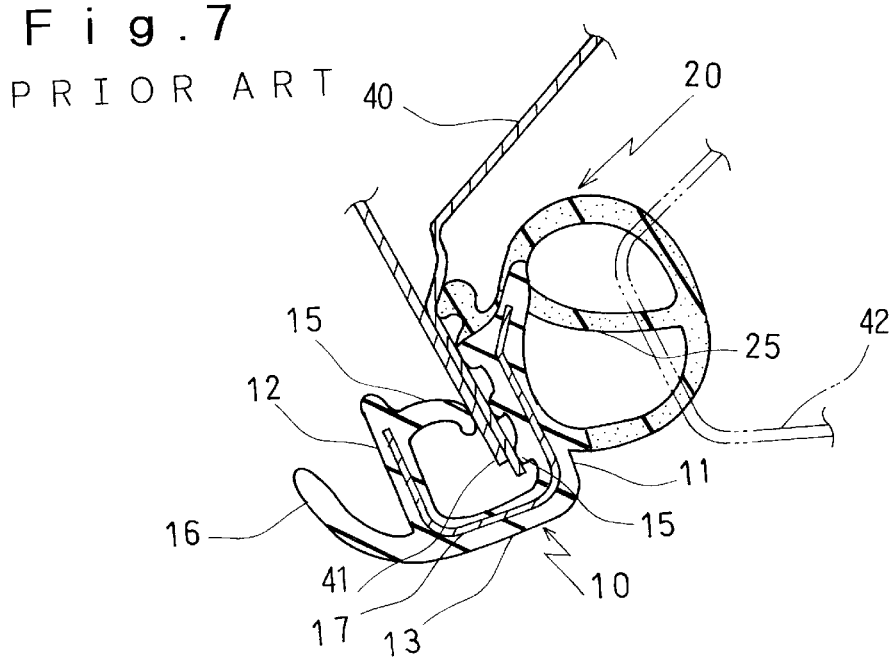
FIG. 7 is an expanded sectional view showing a deformation of another conventional weather strip.
Figure 8:
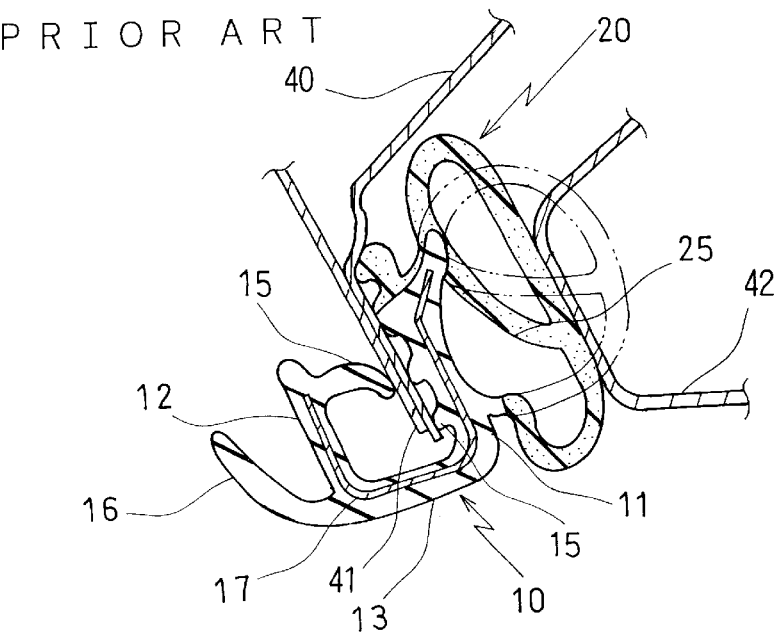
FIG. 8 is an expanded sectional view showing a deformation of the weather strip shown in FIG. 7.

The weather strip in this preferred embodiment comprises, as similar to the prior art shown in FIGS. 5 and 7, an attachment base 10 and a hollow seal portion 30. The attachment base 10 is attached to a flange 41 provided along with the opening for the door 40 of a vehicle body 40. The hollow seal portion 3 is integrally moulded with the outer side wall 11 of the attachment base 10. The hollow seal portion 30 makes a resilient contact with the door 42 when the door 42 of a vehicle is closed.

The attachment base 10 is made substantially U-shaped in section, having an outer wall 11, inner wall 12 and bottom wall 13. The bottom wall 13 connects the outer walls 11 and the inner wall 12. There are provided a number of protruding lips 15 at the inner surfaces of the outer wall 11 and the inner wall 12. The protruding lips slide over the surfaces of the flange 41 when the weather strip is attached to the flange 41. There is also provided a tongue-shaped seal lip 16 at the inner wall 12. The attachment base 10 comprises an inner metal member 17 which is embedded inside the base 10.

The hollow seal portion 30 includes a first wall 31, second wall 32, third wall 33 and fourth wall 34.

One end of the first wall 31 is connected to the outer wall 11 of the attachment base 10 at the near end closer to the bottom wall 13, and the other end spreads toward the outside. Similarly, one end of the second wall 32 is connected to the outer wall 11 of the attachment base at the near end of another side, while the other end spreads toward the outside. That is both the first wall 31 and the second wall 32 make substantially straight lines, and they spread out in opposite directions from the outer wall 11. The first wall 31 is about half of the second wall 32 in length.

One end of the third wall 33 is connected to the second wall 32, while the other end thereof extends inside, and is formed in parallel with the first wall 31. That is, the third wall 33 extends from the second wall 32 making approximately a right angle, and substantially forming rectangularity with the second wall 32. The third wall 33 is similar to the second wall 32 in length. One end of the fourth wall 34 is connected to an end of the third wall 33, while the other end is connected to an end of the first wall 31. The fourth wall 34 is bulge curved toward the outside of the vehicle, that is the direction side at which the wall 34 makes a resilient contact with the door 42. The fourth wall 34 is formed longer than the other walls 31, 32 and 33, in length. The fourth wall 34 makes a resilient contact with the door 42.

There is provided a bridge 35 between the second wall 32 and the fourth wall 34. Although it is not limited to this formation, one end of the bridge 35 is connected approximately to the middle of the second wall, and the other end thereof is connected approximately to the middle of the fourth wall 34 and a little closer to the third wall 33. The bridge 35 is bulge curved toward the first wall 31. In order to make the connection parts 51, 52, 53 as the bending points of the hollow seal portion 30 at the time the door 42 of a vehicle is closed, they are all angularly formed and are made thinner than the other parts of the hollow seal portion 30. The connection part 51 is formed between the second wall 32 and the third wall 33, the connection part 52 is formed between the third wall 33 and the fourth wall 34, and the connection part 53 is formed between the first wall 31 and the fourth wall 34, respectively.

With such arrangement, the area 50, which is made between the point on the fourth wall 34 where the bridge 35 is connected to and the connection part 53 formed between the first wall 31 and the fourth wall 34, is widely bulge curved toward the outside in comparison with the other parts of the hollow seal portion 30. At this point, the first wall 31 and the second wall 32 still keep their positions, while the third wall 33 bends at the connection part 51, and the fourth wall 34 projectively deforms toward the direction the flange 41 extends to, forming the shape in parallel with the flange 41.

Figure 9A:
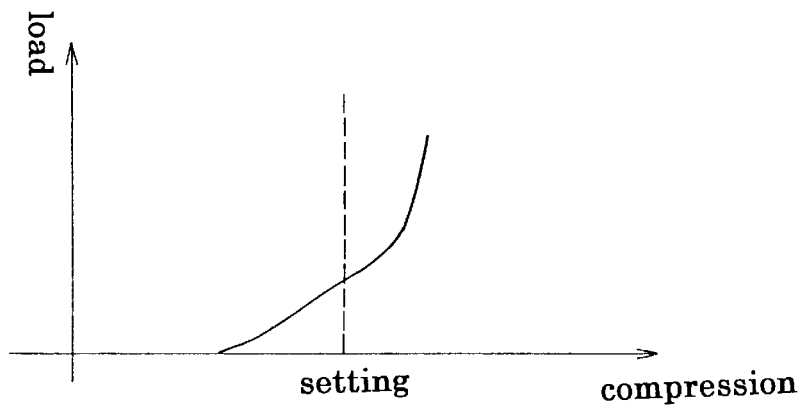
FIGS. 9 (a) and 9 (b) are graphs showing the load curve generated at the time the door is closed, wherein, FIG. 9 (a) shows the case of the conventional example shown in FIG. 7, and FIG. 9 (b) shows the case of the weather strip according to the invention.
Figure 9B:
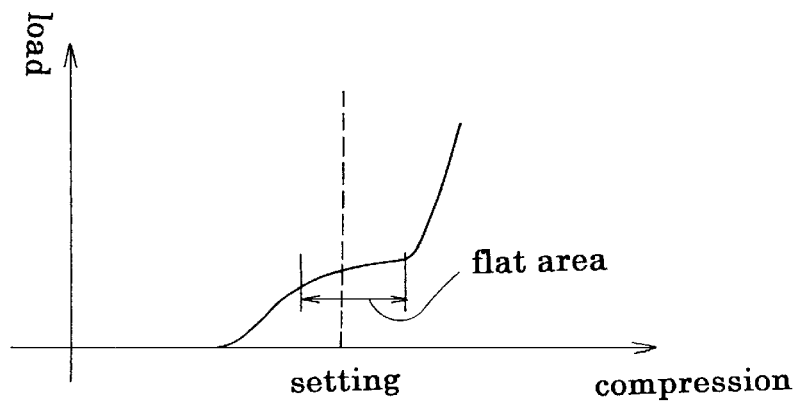

Consequently, as shown in FIG. 9 (b), the flat section is generated, where little change is made in the load while a large change is made in the compression. Therefore, the drastic increasing of the load is suppressed and the closing operation of the door improves.

The inner metal member 17 is embedded in the outer wall 11 and its top edge reaches nearly to the middle of the second wall 32, thereby providing the second wall 32 with enough rigidity. Unlike the sponge rubber-made third wall 33 and the fourth wall 34, the first wall 31 and the second wall 32 as well as the attachment base 10 are formed with solid rubber. Therefore, they have better original rigidity, and thus, they hardly transform.

As described above, the hollow seal portion 30 deforms only at the limited area 50 and it does not deform as a whole. Therefore, the hollow seal portion 30 can smoothly follow the curve of the corner part 60, preventing a development and appearance of wrinkles at the corner part 60.

According to the preferred embodiment of the invention described above, it can generate the flat area, where the load curve merely changes at the time the door is dosed, by forming the connecting parts as the bending points of the hollow seal portion, as well as by spanning the bridge between the second wall and the fourth wall having the longest length among the walls. The connecting parts are formed between the second wall and third wall, the third wall and the fourth wall, and the first wall and the fourth wall as the bending points of the hollow seal portion, respectively. Therefore, the load drastically generated otherwise at the time the door of a vehicle is dosed is suppressed, and the dosing operation of the door improves.

Further, according to the preferred embodiment of the invention, the hollow seal portion bends more easily, since the bending points, which are the connection parts formed between the second wall and the third wall as well as the third wall and the fourth wall, are made thinner compared to the other parts of the hollow seal portion.

Further, according to the preferred embodiment of the invention, the bridge bulge is projectively curved toward the first wall, so that the area made between the point on the fourth wall where the bridge is connected to and the connection part formed between the first wall and the fourth wall can be further projected toward the outside.

Still further, according to the preferred embodiment of the invention, the inner metal member embedded in the attachment base is projected up to the area near the middle of the second wall, so that one end of the bridge connected to the second wall can be firmly fixed.

Consequently, the fourth wall connected with another end of the bridge is improved in that it can smoothly follow the curve of the corner part, preventing a development and appearance of wrinkles at the corner part.

What is claimed is:

1. A weather strip for a vehicle, said weather strip comprising:
   an attachment base and a hollow seal portion,
   wherein said attachment base is U-shaped in section and attached to a flange provided along with a door opening of a body of the vehicle, and said hollow seal portion is integrally moulded with an outer wall of said attachment base and makes resilient contact with a door of the vehicle when the door is closed, and
   wherein:
   said hollow seal portion includes a first wall a second wall, a third wall, a fourth wall and a bridge;
   said first wall protrudes from the outer wall of the attachment base near a bottom wall of the attachment base;
   said second wall is formed longer than the first wall and protrudes from a near end of the outer wall;
   said first wall and second wall extend from the outer wall in opposite directions;
   said third wall is connected with an end of the second wall at one end, forming an approximately rectangular shape with the second wall;
   said fourth wall is connected to another end of the third wall at one end, and is connected with an end of the first wall at another end;
   said fourth wall is made longer than the first, second and third walls and has a bulge curved toward outside of the vehicle; and
   said bridge spans between the second wall and the fourth wall;
   said hollow seal portion has bending points which bend when the door of the vehicle is closed, and said bending points include a connection part formed between the second wall and the third wall, a connection part formed between the third wall and the fourth wall, and a connection part formed between the first wall and the fourth wall.

2. A weather strip as claimed in claim 1, wherein said connection part formed between the second wall and the third wall and the connection part formed between the third wall and the fourth wall are formed thinner than other portions of the hollow seal portion.

3. A weather strip as claimed in claim 2, wherein said bridge is bulge curved toward the first wall.

4. A weather strip as claimed in claim 3, wherein said attachment base comprises an inner metal member embedded therein, and said inner metal member extends approximately to a middle of the second wall.

5. A weather strip as claimed in claim 2, wherein said attachment base comprises an inner metal member embedded therein, and said inner metal member extends approximately to a middle of the second wall.

6. A weather strip as claimed in claim 1, wherein said bridge is bulge curved toward the first wall.

7. A weather strip as claimed in claim 6, wherein said attachment base comprises an inner metal member embedded therein, and said inner metal member extends approximately to a middle of the second wall.

8. A weather strip as claimed in claim 1, wherein said attachment base comprises an inner metal member embedded therein, and said inner metal member extends approximately to a middle of the second wall.

* * * * *